United States Patent
Rossall

(10) Patent No.: US 10,037,476 B2
(45) Date of Patent: Jul. 31, 2018

(54) METHOD AND DEVICE FOR USE WHEN REASSEMBLING A FRAGMENTED JPEG IMAGE

(71) Applicant: Micro Systemation AB, Stockholm (SE)

(72) Inventor: Christopher Rossall, Sodertalje (SE)

(73) Assignee: MICRO SYSTEMATION AB (SE)

( * ) Notice: Subject to any disclaimer, the term of this patent is extended or adjusted under 35 U.S.C. 154(b) by 181 days.

(21) Appl. No.: 15/130,752

(22) Filed: Apr. 15, 2016

(65) Prior Publication Data

US 2016/0335518 A1 Nov. 17, 2016

(30) Foreign Application Priority Data

May 11, 2015 (EP) ..................................... 15167080

(51) Int. Cl.
| | | |
|---|---|---|
| G06K 9/00 | (2006.01) | |
| G06K 9/46 | (2006.01) | |
| G11B 27/28 | (2006.01) | |
| G06K 9/40 | (2006.01) | |
| G06T 3/40 | (2006.01) | |
| G06F 21/62 | (2013.01) | |

(52) U.S. Cl.
CPC ....... *G06K 9/4638* (2013.01); *G06F 21/6272* (2013.01); *G06K 9/40* (2013.01); *G06K 9/4652* (2013.01); *G06T 3/4007* (2013.01); *G11B 27/28* (2013.01)

(58) Field of Classification Search
CPC ...... G06K 9/4638; G06K 9/40; G06K 9/4652; G06F 21/6272; G06T 3/4007; G11B 27/28
See application file for complete search history.

(56) References Cited

U.S. PATENT DOCUMENTS

| | | | | |
|---|---|---|---|---|
| 2008/0279418 | A1* | 11/2008 | Martinek | G06F 17/30067 382/100 |
| 2013/0226923 | A1* | 8/2013 | Thing | G06F 17/30117 707/737 |
| 2016/0335518 | A1* | 11/2016 | Rossall | G11B 27/28 |

FOREIGN PATENT DOCUMENTS

WO    WO 2012/026884 A1    3/2012

OTHER PUBLICATIONS

Hong Guo et al.; "A Method for Recovering JPEG Files Based on Thumbnail" ; Control, Automation and Systems Engineering (CASE) , 2011 International Conference on, IEEE, Jul. 30, 2011 pp. 1-4.
Martin Karresand; "Completing the picture: fragments and back again" Jan. 1, 2008; Retrieved from the internet: URL: http://www.diva-portal.org/smash/get/diva2:18186/FULLTEXT01.pdf. Retrieved on Oct. 26, 2015.
Martin Karresand, et al.; "Reassembly of Fragmented JPEG Images Containing Restart Markers", Computer Network Defense, 2008. EC2ND 2008. European Conference on, IEEE, Piscataway, NJ, USA. Dec. 11, 2008. pp. 25-32.

(Continued)

*Primary Examiner* — Sean Motsinger
(74) *Attorney, Agent, or Firm* — Condo Roccia Koptiw LLP

(57) ABSTRACT

The present invention concerns the recovery of fragmented files. In particular, the present invention concerns finding fragmentation points and continuation points of a fragmented JPEG image for purposes of reassembling the JPEG image. The continuation points are found by using a JPEG thumbnail image corresponding to the JPEG image to be reassembled.

20 Claims, 2 Drawing Sheets

(56) References Cited

OTHER PUBLICATIONS

Kamaruddin Malik Mohamad, et al.; "Cawing JPEG images and thumbnails using image pattern matching", Computers & Informatics (ISCI), 2011 IEEE Symposium on, IEEE, Mar. 20, 2011, pp. 78-83.
Nurul Azma Abdullah, et al.; "Carving Thumbnails and Embedded JPEG Files Using Image Pattern Matching", Journal of Software Engineering and Applications, vol. 6, No. 3, Jan. 1, 2013, pp. 62-66.
A. Pal et al.; "The evolution of file carving", IEEE Signal Processing Magazine, vol. 26, No. 2, Mar. 1, 2009, pp. 59-71.
International Telecommunication Union; "CCIT Recommendation T.81—Information Technology—Digital Compression and Coding of Continuous-Tone Still Images—Requirements and Guidelines", CCITT Recommendation T.81, Jan. 1, 1992, pp. 1-181.
B. Furht; "A Survey of Multimedia Compression Techniques and Standards. Part I: JPEG Standard", Real-Time Imaging, Academic Press Limited, GB, vol. 1, No. 1, Apr. 1, 1995, pp. 49-67.

\* cited by examiner

METHOD AND DEVICE FOR USE WHEN REASSEMBLING A FRAGMENTED JPEG IMAGE

TECHNICAL FIELD

The application claims the benefit of European Patent Application No. 15167080.9, filed May 11, 2015, the contents of which are incorporated by reference herein.

TECHNICAL FIELD

The present invention concerns the recovery of fragmented files. In particular, the present invention concerns finding fragmentation points and continuation points of a fragmented JPEG image for purposes of reassembling the JPEG image.

BACKGROUND OF THE INVENTION

With the ever increasing adoption of digital storage mediums, the need for more sophisticated data recovery and forensic recovery products have also increased. Most file systems and storage devices store data by dividing it into many clusters and by maintaining the list of clusters (file-table) used for storing the data of each file. For example, in the file system FAT-32 the root table entry with the file name will point to the first cluster of the file, which in turn will point to the next cluster, and so on, until the last cluster of the file. When a file is accessed, the data is retrieved in sequence from this list of clusters. Similarly, deletion of a file is typically realized by removing a file's entry from the file table. Traditional data recovery and forensics products attempt to recover data by analyzing the file system and extracting the data pointed to by the file system. Traditional recovery techniques fail to recover data when the file system is corrupted, not present, or has missing entries. So-called "file carving" was introduced to recover files from the "unallocated" space of a disk (the area of the disk not pointed to by the file system).

A file is said to be "fragmented" when it is not stored on a continuum of sectors of data. (The meaning of the term "sectors of data" is intended to include "clusters" or "data blocks") For example, file fragmentation is said to occur when a file is not stored in the correct sequence on consecutive sectors of data on disk. In other words, if a file is fragmented, the sequence of sectors of data from the start of a file to the end of the file will result in a partly and/or incorrect reconstruction of the file.

One file that may be interesting to recover from a forensics point of view is JPEG images. Since a JPEG image may contain a lot of data, the risk of a JPEG image to be fragmented may be substantial. "Completing the Picture—Fragments and Back Again" by Martin Karresand suggest a method for reassembling a JPEG image, wherein RST markers included in sectors of data in a JPEG image are used in order to determine possible sectors of data to be combined when reassembling the JPEG image. Since JPEG compression consist of storing data in the frequency domain, a combination of two sectors of data is validated by comparing the DC coefficients of the separate sectors of data.

However, this is a complex method, and it may for example be difficult to manually verify the correctness of the result since the data in the frequency domain is impossible for a user to comprehend.

It is within this context that embodiments of the invention arise.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for use when reassembling a fragmented JPEG image from a collection of sectors of data comprising a plurality of consecutive sectors of data, wherein at least some of the plurality of consecutive sectors of data comprises a respective restart marker value.

A sector of data typically consists of 512 bytes but different types of memory may comprise sectors of data of other sizes.

Restart Markers (RST) are a feature of the JPEG File format and can be used to detect fragmentation or corruption of an image. There are 8 different RST values called RST0-RST7, represented as 0xFFD0-0xFFD7 in hexadecimal. A JPEG file using restart markers will have a sector of data comprising a RST value possibly followed by one or more sectors of data not comprising a RST value i.e. a JPEG Minimum Coded Unit (MCU), and then a sector of data comprising the next RST value and so forth. After RST7, the next marker is RST0. It is also possible that there could be several RST marker values within one sector of data.

The method comprises to, among the plurality of consecutive sectors of data, locate a sector of data comprising a JPEG file signature.

From the sector of data comprising the JPEG file signature and at least one consecutive sector of data, a JPEG thumbnail corresponding to the JPEG image to be reassembled may then be extracted. A thumbnail image is a small image which is contained in a JPEG file, and is typically low resolution, for example 160×128 pixels in size. The thumbnail is a small version of the main image, i.e. the image to be reassembled. They are generally located in the first few kilobytes of a JPEG file and the likelihood of obtaining a non-fragmented thumbnail is much higher than the likelihood of extracting the main image without fragmentation. It should be noted that the JPEG thumbnail may be extracted only from sector(s) of data consecutive to the sector of data comprising the JPEG file signature. In other words, the sector of data comprising the JPEG file signature may in some embodiments not comprise any of the data making up the JPEG thumbnail. The most common case is that the JPEG thumbnail will not begin within the first sector of the file i.e. the sector of data comprising the JPEG file signature. Usually other EXIF metadata such as time stamps, aperture settings and possibly GPS co-ordinates appear before the actual thumbnail.

The method further comprises to, from sectors of data consecutive to the sector of data comprising the JPEG file signature, determine sectors of data belonging to the JPEG image to be reassembled, and a first fragmentation point sector of data, wherein the first fragmentation point sector of data corresponds to a restart marker value.

For example, first the sector comprising a Start of Scan (SoS) hexadecimal value is located. In a JPEG image file, the encoded data of the picture comes just after the SoS sector. After the SoS segment, all segments of data until and including the first fragmentation point sector of data are determined to belong to the JPEG image to be reassembled.

Fragmentation occurs when a collection of data, in this case the JPEG image to be reassembled, in memory is broken up into many pieces that are not in consecutive order e.g. in the plurality of consecutive sectors of data.

As used herein, the term "first fragmentation point sector of data" should be understood to mean the last sector of data prior to the sector of data among consecutive sectors of data which is determined to not belong to the JPEG image to be reassembled.

Typically, in a JPEG encoded image, a sector of data comprising a RST marker is followed by one or more sectors of data not comprising a RST marker, i.e. a JPEG Minimum Coded Unit (MCU). The number of the one or more sectors of data not comprising a RST marker may vary in a JPEG image. As mentioned earlier, it is possible to encounter multiple RST markers within one sector of data although this is not the common case. There is a JPEG marker called DRI which defines the number of MCU's between restart markers. As MCU's are variable-sized themselves, there is not an easily predictable way to see the amount of bytes (or sectors) between restart markers. In case the first fragmentation point sector of data is determined to be a sector of data not comprising a RST marker value, the first fragmentation point sector of data is determined to correspond to the restart marker value of an immediately preceding sector of data comprising a RST marker. In the case a plurality of RST marker exists in the immediately preceding sector of data comprising a RST marker, the first fragmentation point sector of data is determined to correspond to the value of the last of the plurality of RST markers.

The method may further comprise to, based on the restart marker value corresponding to the first fragmentation point sector of data, selecting a plurality of candidate sectors of data among said at least some of the plurality of sectors of data comprising a respective restart marker value. In the case a sector of data comprises several RST markers; the first RST marker in the sector of data is used when selecting candidate sectors of data.

The next step of the method is to determining a continuation point sector of data by for each candidate sector of data,
form a candidate set of sectors of data by appending at least the candidate sector of data to the sectors of data belonging to the JPEG image to be reassembled, and
calculate a fitness score for the candidate sector of data by using the candidate set of sectors of data and the JPEG thumbnail as parameters in a fitness function.

In other words, each candidate sector of data is tested to see if it fits on to the sectors of data already determined to belong to the JPEG image to be reassembled, and this test involves comparison to the JPEG thumbnail which was not fragmented and thus represent to down sampled version of the actual JPEG image to be reassembled. Using the JPEG thumbnail as a key, a fitness score for each candidate sector of data can be calculated.

From these calculated fitness scores the candidate sector of data with a highest fitness score among the calculated fitness scores can then advantageously be selected as the best continuation point sector of data for determining further sectors of data belonging to the JPEG image to be reassembled. It should be noted that the feature "highest fitness score" should be understood to correspond to the best fit among the candidate sectors of data and the sectors of data already determined to belong to the JPEG image to be reassembled.

According to some embodiments, the step of determining sectors of data belonging to the JPEG image to be reassembled, and a first fragmentation point sector of data, comprises at least one of
determining that a sector of data comprises a restart marker value which do not follow on a restart marker value of a preceding sector of data, and
determining that a sector of data comprises low entropy data.

For example, if a sector of data comprising the RST3, and is followed by a number of sectors of data not having a RST marker and then is followed by sector of data comprising RST1, the sector of data immediately preceding the sector of data with the RST1 marker is determined to be first fragmentation point sector of data. In other words, if the RST markers appear in the wrong order, the JPEG image to reassemble is considered to be fragmented.

Another technique for discovering fragmentation is to look for low entropy sectors. The main area of the JPEG file (after the SOS marker) should contain high entropy data. If a sector of data has low entropy, this may indicate that it is not part of the JPEG image to be reassembled and the sector of data immediately preceding the sector of data with low entropy data is determined to be first fragmentation point sector of data.

It would also be possible to use the value of the DRI tag described above in order to determine if a fragmentation point has been reached. According to some embodiments, the step of determining sectors of data belonging to the JPEG image to be reassembled, and a first fragmentation point of sector data, may comprise at least one of
determining that a number of MCU's that have passed since an RST marker was found is larger than the value of the DRI tag, and
determining that a number of MCU's that have passed between two RST markers is less than the value of the DRI tag.

For example, if the DRI tag defines that a sector of data comprising a RST marker should be followed by two MCU's, but it is determined (e.g. after the use of Huffman decoding) that more than two (e.g. three) MCU's follows on a sector of data with a RST marker, the first fragmentation point sector of data may be determined to be the sector of data corresponding to the second MCU.

As another example, if the DRI tag defines that a sector of data comprising an RST marker should be followed by four MCU's, but it is determined that only two (i.e. less than four) MCU's passes before the next RST marker is found, the first fragmentation point sector of data may be determined to be the sector of data corresponding to the second MCU. In general, by counting a number of MCU's that passes between (or at least after) RST markers, and by comparing this number to the value of the DRI tag, it may be discovered that a fragmentation point has been reached.

The value of the DRI tag may also be used when determining a continuation point sector of data for a candidate sector of data. If, for example, a fragmentation point sector of data is found by determining that two MCU's are missing, a continuation point may be backtracked by also including sectors corresponding to two MCU's before the sector containing the RST marker corresponding to the continuation point sector of data.

According to some embodiments, the step of determining a continuation point sector of data may comprise at least forming a candidate set of sectors of data by appending additional sectors of data corresponding to at least a number of MCU's before the candidate sector of data to the sectors of data belonging to the JPEG image to be reassembled, wherein the number of MCU's corresponds to a difference between the value of the DRI tag and the determined number of MCU's that have passed between two RST markers. The additional number may be less than, or equal to, said difference.

To determine if a fragmentation point has been reached, it may be possible to examine Huffman tables. Typically, in a JPEG encoded image, the minimum coded units (MCU's) are to be decoded by the use of one or many Huffman tables that are specified by a DHT (Define Huffman Table) marker, by parsing said DHT marker to rebuild a Huffman tree or (if possible) to use the Huffman table directly. If an attempt at decoding an MCU (i.e. a sector of data without an RST marker) is made and a bit pattern of the MCU is found not to exist in the used Huffman tree (or table), this may signify that a fragmentation point has been reached.

According to some embodiments, the step of determining sectors of data belonging to the JPEG image to be reassembled, and a first fragmentation point sector of data, may comprise at least the steps of parsing at least one DHT marker corresponding to at least one Huffman table, and determining that a bit pattern found within a sector of data without an RST marker does not exist within said at least one Huffman table.

According to some embodiments, the step of forming a candidate set of sectors of data comprises: from sectors of data consecutive to the candidate sector of data, determining sectors of data belonging to a same JPEG image, and a second fragmentation point sector of data, wherein the sectors of data belonging to the same JPEG image comprises the candidate sector, and forming the candidate set of sectors of data by appending the sectors of data belonging to the same JPEG image to the sectors of data belonging to the JPEG image to be reassembled.

Consequently, the same algorithm for determining the first fragmentation sector of data may now be used in order to find how many sectors, starting with the candidate sector of data, which may be part of a same JPEG image, and then append all of these sectors to the sectors of data belonging to the JPEG image to be reassembled prior to finally calculating a fitness score involving comparison with the JPEG thumbnail. This embodiment may increase the speed of the algorithm for reassembling the JPEG image.

According to some embodiments, the step of determining sectors of data belonging to a same JPEG image, and a second fragmentation point sector of data, comprises at least one of:
  determining that a sector of data comprises a restart marker value which do not follow on a restart marker value of a immediately preceding sector of data, and
  determining that a sector of data comprises low entropy data.

Consequently, the same algorithm for determining the first fragmentation point sector of data may be used for determining the second fragmentation point sector of data. The above described embodiments of using the DRI marker, or the DHT marker and a corresponding Huffman table, for determining the first fragmentation point sector of data may be employed also for determining the second fragmentation point sector of data.

According to some embodiments, the step of calculating a fitness score comprises decoding the candidate set of sectors of data to form a candidate JPEG image and wherein the fitness function comprises comparing the candidate JPEG image with the JPEG thumbnail. This embodiment facilitates manual verification of the correctness of the result from the algorithm, and also provides a fitness function which may be robust for the cases where some of the sectors of data determined to belong to the JPEG image to be reassembled are in fact not belonging to the JPEG image to be reassembled, or the cases where the algorithm has missed some sectors of data which should belong to the JPEG image to be reassembled.

According to some embodiments, the step of calculating a fitness score comprises rescaling the candidate JPEG image to match a size of the JPEG thumbnail. This is advantageously since no pixels in the answer of the fitness function, i.e. the JPEG thumbnail, are "made up" by rescaling the JPEG image to the size of the candidate JPEG image. Instead, the candidate JPEG image is scaled down to the size of the JPEG thumbnail. Preferably, such scale down operation is performed using bilinear or bicubic interpolation. This also further facilitates that small error in the candidate JPEG image e.g. due to previous missed sectors of data in it may not have a great impact on the fitness score.

According to some embodiments, the step of calculating a fitness score comprises converting the candidate JPEG image and the JPEG thumbnail into grayscale.

The fitness function may according to some embodiments comprise calculating a difference between each pixel in the candidate JPEG image with a corresponding pixel in the JPEG thumbnail, and comparing the difference with a threshold value and increment a counter value for each difference that meet the threshold value, wherein the fitness score corresponds to the counter value. By performing the comparison between the pixels in grayscale, the speed of such comparison may increase comparing to do the comparison in colour. The fitness score may also be easily understood and easily calculated. By allowing some difference between the corresponding pixels in the candidate JPEG image and the JPEG thumbnail, rescaling or interpolation errors (e.g. rounding errors) may be disregarded.

The fitness function may according to some embodiments comprise calculating differences between pixels in the candidate JPEG image with corresponding pixels in the JPEG thumbnail, comparing the calculated difference with a first threshold value and increment a counter value for each difference that do not meet the first threshold value, wherein the calculating and comparing differences are not performed if the counter value exceeds a second threshold value, and wherein the fitness score is sat to a first value if the counter value exceeds the threshold value, and to a second value higher than the first value if the counter value do not exceeds the second threshold value. By performing the comparison between the pixels in grayscale, the speed of such comparison may increase comparing to do the comparison in colour. By allowing some difference between the corresponding pixels in the candidate JPEG image and the JPEG thumbnail, rescaling or interpolation errors may be disregarded. Moreover, by aborting the comparison of pixels between the candidate JPEG image and the JPEG thumbnail if too many (e.g. more than $\frac{1}{16}$ or $\frac{1}{10}$ (or any other suitable fraction) of the number of pixels in the images results in a differences above the first threshold value), the computational complexity of the fitness function may decrease.

The fitness score according to this embodiment may be set to be the number of difference that does meet the first threshold in case the above described counter value never exceeds the second threshold value.

According to some embodiments, the method further comprises the step of sorting said least some of the plurality of consecutive sectors of data comprising a respective restart marker value into a plurality of lists, wherein each list corresponds to a restart marker value and comprises a plurality of sectors of data each comprising the restart marker value. By performing this step, the step of selecting a plurality of candidate sectors of data may comprise selecting a list based on the restart marker value of the fragmentation point sector of data, wherein the plurality of candidate sectors of data comprises the plurality of sectors of data in the selected list. This embodiment filters out and sorts the sectors of data comprising a RST marker once in one sweep, which may increase the speed of finding suitable candidate sectors of data for a specific fragmentation point sector of data.

According to some embodiments, when one sector of data in a particular list has been used as a continuation point sector of data, this sector may be removed from the corresponding list in order to increase the speed of determining further continuation point sector of data for the collection of sectors of data.

According to some embodiments, the method further comprises the step of calculating an entropy value for each sector of data of the plurality of consecutive sectors of data, wherein the plurality of candidate sectors each having an entropy value above a threshold entropy value. As described above, sectors of data which are part of a JPEG image typically comprise high entropy data. Moreover, a RST marker is a two bytes hexadecimal number which may appear by pure chance among the collection of sectors of data. The present embodiment may advantageously remove such sectors of data from the list of candidate sectors of data wherein the RST marker appear by pure chance.

According to some embodiments, the step of sorting said at least some of the plurality of consecutive sectors of data comprising a respective restart marker value into a plurality of lists comprises only sorting sectors of data having an entropy value above the threshold entropy value. This embodiment thus further decreases the risk of having a sector of data wherein the RST marker appears by pure chance as a candidate sector of data.

According to some embodiments, the method described above can be performed recursively such that if a further fragmentation points sector of data are found after the second fragmentation point sector of data, the method is repeated for finding more sectors of data that belongs to the JPEG image to be reassembled. In other words, if the JPEG image to be reassembled are stored among the collection of sectors in more than two fragments, the method are just performed again for finding fragment 3, 4 etc.

In a second aspect, the present invention provides a computer program product comprising a computer-readable storage medium with instructions adapted to carry out the method according to the first aspect when executed by a device having processing capability.

In a third aspect, the present invention provides a device to be used when reassembling a fragmented JPEG image from a collection of sectors of data comprising a plurality of consecutive sectors of data, wherein at least some of the plurality of consecutive sectors of data comprises a respective restart marker value, the device being adapted to:
among the plurality of consecutive sectors of data, locate a sector of data comprising a JPEG file signature,
from the sector of data comprising the JPEG file signature and at least one consecutive sector of data, extract a JPEG thumbnail corresponding to a JPEG image to be reassembled,
from sectors of data consecutive to the sector of data comprising the JPEG file signature, determine sectors of data belonging to the JPEG image to be reassembled, and a first fragmentation point sector of data, wherein the first fragmentation point sector of data corresponds to a restart marker value,
based on the restart marker value corresponding to the first fragmentation point sector of data, select a plurality of candidate sectors of data among said at least some of the plurality of sectors of data comprising a respective restart marker value,
determine a continuation point sector of data by for each candidate sector of data,
form a candidate set of sectors of data by appending at least the candidate sector of data to the sectors of data belonging to the JPEG image to be reassembled, and
calculate a fitness score for the candidate sector of data by using the candidate set of sectors of data and the JPEG thumbnail as parameters in a fitness function,
select the candidate sector of data with a highest fitness score among the calculated fitness scores as a continuation point sector of data for determining further sectors of data belonging to the JPEG image to be reassembled.

The second and third aspect may generally have the same features and advantages as the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention proposes a method and device to be used when reassembling a fragmented JPEG image from a hard disk or a flash dump, wherein the hard disk or flash dump comprises a collection of sectors of data. Some flash storage, e.g. NAND flash storage, organize sectors of data (e.g. 512 bytes or 2048 bytes of data) into a page, wherein each page is associated with e.g. 16 or 64 bytes of extra data called spare areas or spare columns. It should be noted that such spare areas are not considered to be a sector of data as described in the present invention. According to some embodiments, these spare columns are filtered out prior to any search for JPEG images to be reassembled. Other types of flash storage, e.g. eMMC flash storage, comprise no spare columns and the above described filtering operation is thus not necessary for these. The hard disk or flash storage may be the memory of a mobile phone or a computer or similar computing devices.

Figure 1:
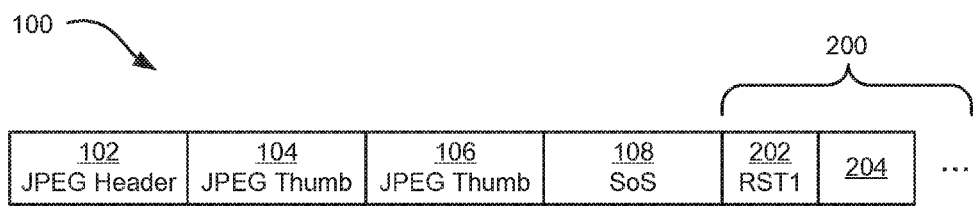
FIG. 1 shows by way of example a collection of sectors of data comprising a JPEG image to be reassembled.
Figure 2:
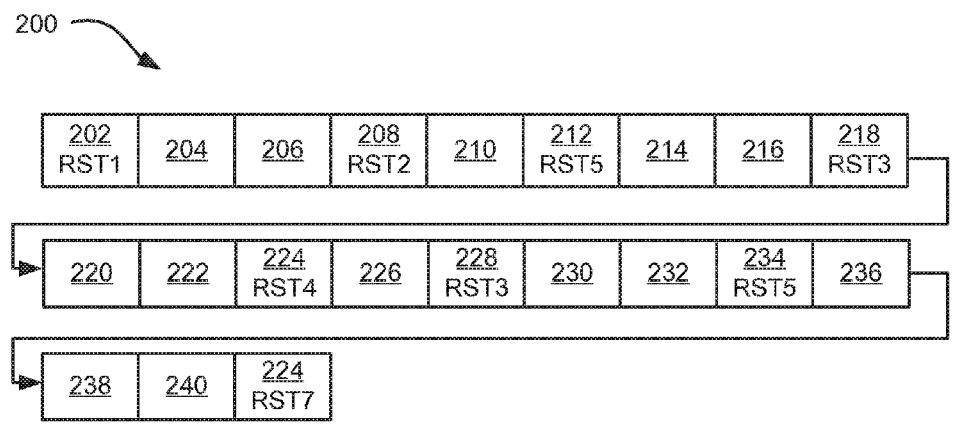
FIG. 2 shows by way of example a collection of sectors of data comprising image data of a fragmented JPEG image.

A method for use when reassembling a fragmented JPEG image will now be described in conjunction with FIGS. 1-3. It should be noted that the collection of sectors of data in FIGS. 1-2 have been simplified in order to more easily describe the invention.

The search for JPEG images to be reassembled starts by loading the dump file (hard disk, flash dump etc.) into memory of a device to be used when reassembling a fragmented JPEG image. The dump file comprises a collection of sectors of data comprising a plurality of consecutive sectors of data 100, 200. The device may according to some embodiments be configured to first step through the plurality of consecutive sectors of data 100, 200 and making a list of each sector beginning with e.g. a hexadecimal value corresponding to a JPEG file signature. In FIG. 1, the JPEG file signature or JPEG header is found in the first sector 102. The hexadecimal value may be 0xFF 0xD8 0xFF. In other words, the method for use when reassembling a fragmented JPEG image may start of by among the plurality of consecutive sectors of data, locating S302 a sector of data 102 comprising a JPEG file signature.

The next step in the method is to from the sector of data 102 comprising the JPEG file signature and at least one consecutive sector of data 104, 106, extract S304 a JPEG thumbnail corresponding to a JPEG image to be reassembled. As described above, the thumbnail is generally located in the first few kilobytes of the JPGE file, which means that it is typically located in one or more of the sectors of data following the sector of data 102 comprising the JPEG file signature. According to some embodiments, parts of the data of the JPEG thumbnail is comprised in the same sector of data 102 as the JPEG file signature.

If a JPEG thumbnail can be extracted, the search for data belonging to the JPEG image corresponding to the JPEG image can start. The method may continue by stepping forward until a sector of data 108 comprising the Start of Scan (SoS) marker is found. After this sector of data 108, the image data of the JPEG image may be found. This means that from sectors of data 104-108, 200 consecutive to the sector of data 102 comprising the JPEG file signature, sectors of data belonging to the JPEG image to be reassembled can be determined, and also any existing fragmentation point(s) for the JPEG image to be reassembled.

Fragmentation may for example arise when free memory is separated into small blocks and is interspersed by allocated memory. When for example a JPEG image is stored in the free memory, the image data of the JPEG image may be divided into several of the blocks of free memory. Since, in a forensic situation, the file system is typically corrupt and thus lacks the pointer between the blocks of memory in which the image data of the JPEG image can be found, carving techniques is needed. However, the problem of finding all fragments of a JPEG image still needs to be solved, and the present invention may provide a solution to this problem.

So, when determining sectors of data belonging to the JPEG image to be reassembled, the method may comprise stepping through the sectors consecutive to the sector of data 108 comprising the SoS marker until a first fragmentation point sector of data is found S306. Such fragmentation point sector of data may for example be found if a sector of data is determined to comprise low entropy data, since image data of a JPEG image typically has high entropy. In FIG. 2, the sector of data referred to as 210 is determined to comprise such low entropy data. Example code for determining if a sector of data comprises low or high entropy data follows:

```
bool isHighEntropy(BYTE* data)
{
    DWORD counters[256];
    memset(counters,0,sizeof(counters));
    for(DWORD i=0;i<SECTOR_SIZE;i++)
        counters[data[i]]++;
    DWORD max=0;
    for(DWORD i=0;i<256;i++)
        if(counters[i]>ENTROPY_FACTOR)
            return false;
}
```

The first fragmentation point sector of data 208 is thus determined S306 to be the sector of data 208 which is immediately preceding the sector of data 210 comprising low entropy data. This in turn means that all sectors of data 202-208 between the SoS marker 108 and the sector of data 210 comprising low entropy data is determined to belong to the JPEG image to be reassembled.

However, not all image data of the JPEG image to be reassembled has been found. This can be determined e.g. from comparison with the JPEG thumbnail or by determining if the two last bytes of the JPEG image to be reassembled has the values of 0xFF 0xD9 which defines the end of a JPEG encoded image according to the JPEG standard. Consequently, it may be needed to find a continuation point sector of data from which the next fragment of the JPEG image starts. This can be done by taking advantage of the RST marker values which are utilized in JPEG encoded images. In the example described in FIG. 2, the first fragmentation point sector of data 208 comprises a RST2 marker value, but as described above, in case the first fragmentation point sector of data do not comprise a RST marker value, the first fragmentation point sector of data is determined to correspond to the restart marker value of the first preceding sector of data comprising a RST marker. So based on the restart marker value RST2 corresponding to the first fragmentation point sector of data 208, a plurality of candidate sectors of data among said at least some of the plurality of sectors of data comprising a respective restart marker value are selected S308. A candidate sector should thus comprise a RST marker value following on RST2, which means that a candidate sector should comprise the RST3 marker value. In FIG. 2, this corresponds to the sectors referred to as 218 and 228.

It should be noted that according to some embodiments, the method comprises sorting the sectors of data comprising a respective restart marker value into a plurality of lists, and this may advantageously be done for the entire collection of sectors of data in the flash dump (hard drive etc.) prior to any reassembling of JPEG images are performed. Each of these 8 lists corresponds to a restart marker value. In other words, 8 lists may be created, and correspond to RST0-7, by stepping through all sectors for data in the collection of sectors of data and search for the respective RST marker value. When such a sector of data is found, this sector of data is added to the corresponding list.

These lists may then be used for selecting S308 the plurality of candidate sectors of data, i.e. a list based on the restart marker value of the fragmentation point sector of data is selected, and the plurality of candidate sectors of data may in this case comprises the plurality of sectors of data in the selected list. In the example shown in FIGS. 1-2 and described above, the list would comprise two candidate sectors of data 218, 228.

According to some embodiments, only a sector of data comprising high entropy data may be selected as a candidate sector. As described above, sectors of data comprising JPEG image data typically has high entropy. Consequently, only selecting candidate sectors of data having such high entropy data may provide a more efficient method for reassembling a JPEG image. In other words, in case e.g. the second sector of data 228 comprising the RST3 marker value would comprise low entropy data, this sector would not be used as a candidate sector of data. Advantageously, only sectors of data comprising high entropy data (i.e. above the threshold entropy value) would be sorted into the plurality of lists which then is used for determining candidate sectors of data. According to some embodiments, the method for use when reassembling a fragmented JPEG image comprises the steps of first step through the collection of sectors of data one by one, calculating the entropy of each sector and put all high-entropy sectors in a specific high-entropy list. Then, based on this specific high-entropy list, the 8 RST-lists described above may be created by stepping through the sectors of data in the specific high-entropy list, one by one, and adding each sector of data comprising a RST marker value to the corresponding list.

After the candidate sectors of data 218, 228 have been selected S308, a continuation point sector of data is determined S310. This is done by, for each candidate sector of data 218, 228, forming a candidate set of sectors of data by appending at least the candidate sector of data 218, 228 to the sectors of data 202-208 belonging to the JPEG image to be reassembled. This means that in the example described in FIGS. 1-2, two candidate sets of sectors of data is formed. On set including sectors 202-208 and at least the first candidate sector of data 218, and one set including sectors 202-208 and at least the second candidate sector of data 228.

According to some embodiments, not only the candidate sector of data is appended to the sectors of data belonging to the JPEG image to be reassembled. Instead, for each candidate sector of data, sectors of data consecutive to the candidate sector and belonging to a same JPEG image is determined. This is done by stepping through the sectors of data consecutive to the candidate sector of data and looking for a second fragmentation point sector of data. In other words, a complete fragment of a JPEG image is appended to the JPEG image to be reassembled and forms S312 the candidate set of sectors of data. In many cases, the complete fragment that is appended belongs to a JPEG image different from the JPEG image to be reassembled, but in some cases, the complete fragment that is appended also belongs to the JPEG image to be reassembled. The second fragmentation point sector of data may be found in the same way as the first fragmentation point sector of data, i.e. by determining that a sector of data comprises a restart marker value which do not follow on a restart marker value of a preceding sector of data, or determining that a sector of data comprises low entropy data. In the example of FIG. 2, sectors referred to as 218-226 is determined to belong to the same JPEG image since sectors 220, 222 and 226 not comprising a RST marker value comprise high entropy data and sector 224 comprises the correct RST marker value, i.e. RST4 which follows on the RST3 which is the RST marker value of the preceding sector of data 218. However, sector referred to as 228 comprises a RST marker value (RST3) which is wrong and do not follow on a restart marker value of a preceding sector of data 224. Consequently, the second fragmentation point sector of data is determined to be the sector of data referred to as 226. This means that the first candidate set of sectors of data comprises sectors referred to as 202-208 and 218-226. For the second candidate sector of data, the sector of data referred to as 232 is determined to comprise comprises low entropy data which means that the second candidate set of sectors of data comprises sectors referred to as 202-208 and 228-230.

The next step is to calculate S314 a fitness score for each candidate sector of data using the candidate set of sectors of data and the JPEG thumbnail as parameters in a fitness function. The fitness function may be any function which compare data of the JPEG thumbnail with the candidate sectors of data and returns a fitness score which can be used for selecting S318 which of the plurality of candidate sectors of data to be used a continuation point sector of data. The fitness function may for example compare the frequency components in the JPEG encoded thumbnail with the JPEG encoded data in the candidate sectors of data. The fitness function may also comprise decoding the candidate set of sectors of data to form a candidate JPEG image and wherein the fitness function comprises comparing pixel data of the candidate JPEG image with pixel data of the JPEG thumbnail. This comparison may comprise rescaling the JPEG thumbnail to the size of the candidate JPEG image, or it may comprise rescaling the candidate JPEG image to match a size of the JPEG thumbnail.

According to some embodiments, the fitness function comprises converting the candidate JPEG image and the JPEG thumbnail into grayscale images.

By way of example, two fitness functions in which grayscale images is compared to provide a fitness score will now be shown. In both these examples, the candidate JPEG image is rescaled to match the size of the JPEG thumbnail.

The first fitness function comprises calculating a difference between each pixel in the candidate JPEG image with a corresponding pixel in the JPEG thumbnail, and comparing the difference with a threshold value and increment a counter value for each difference that meet the threshold value, wherein the fitness score corresponds to the counter value.

```
DWORD GetItemScore(HBITMAP current, int cx, int cy, vector<BYTE>
&thumbVec)
{
    //Shrink "real" pic
    if (current)
    {
        HBITMAP newPic;
        if (ShrinkPic(current, cx, cy, newPic))
        {
            vector<BYTE> newVect;
            //2 thumb sized grayscale pictures for comparison
            if (PicTo16Greyscale(newPic, newVect))
            {
                DWORD similarity = 0;
                for (int z = 0; z < newVect.size( ); z++)
                {
                    if (thumbVec[z] == newVect[z])
                        similarity++;
                }
                DeleteObject(newPic);
                return similarity;
            }
        }
    }
    return 0;
}
```

In the above example, the threshold value is set to zero, i.e. the counter value is only increased if the pixel value in the resized candidate JPEG image equals the corresponding pixel value in the JPEG thumbnail, but according to embodiments, this part of the method may be changed to:

```
if (fabs(thumbVec[z] - newVect[z]) < difference_threshold)
    similarity++;
``` wherein the "difference_threshold" is set to any suitable value depending on the number of grayscale values that are possible in the grayscale image. Typically the grayscale image may comprise 256 grayscale values, but using 16 values are also possible.

This also applies to the second fitness function.

The second fitness function comprises calculating differences between pixels in the candidate JPEG image with corresponding pixels in the JPEG thumbnail, comparing the calculated difference with a first threshold value and increment a counter value for each difference that do not meet the first threshold value, wherein the calculating and comparing differences are not performed if the counter value exceeds a second threshold value, and wherein the fitness score is sat to a first value if the counter value exceeds the threshold value, and to a second value higher than the first value if the counter value do not exceeds the second threshold value. The fitness score according to this embodiment may be set to be the number of differences that does meet the first threshold in case the above described counter value never exceeds the second threshold value.

```
DWORD GetItemScore(HBITMAP current, int cx, int cy, vector<BYTE> &thumbVec)
{
    //Shrink "real" pic
    if (current)
    {
        HBITMAP newPic;
        if (ShrinkPic(current, cx, cy, newPic))
        {
            vector<BYTE> newVect;
            if (PicTo16Greyscale(newPic, newVect))
            //2 thumb sized grayscale pictures for comparison
            {
                DWORD similarity = 0;
                DWORD diffs = 0;
                DWORD threshold = cx*cy / 16;
                for (int z = 0; z < newVect.size( ); z++)
                {
                    if (thumbVec[z] == newVect[z])
                        similarity++;
                    else
                        diffs++;
                    if (diffs>threshold)
                    {
                        break;
                    }
                }
                DeleteObject(newPic);
                return similarity;
            }
        }
    }
    return 0;
}
```

In this embodiment, the second threshold value is sat to 1/16 of the number of pixels in the thumbnail image, i.e. (cy*cx)/16 wherein cy is the size of the thumbnail image in a y-direction of the image and cx is the size of the thumbnail image in a x-direction of the image but other thresholds may be used such as 1/5, 1/10 or 1/20.

Figure 3:
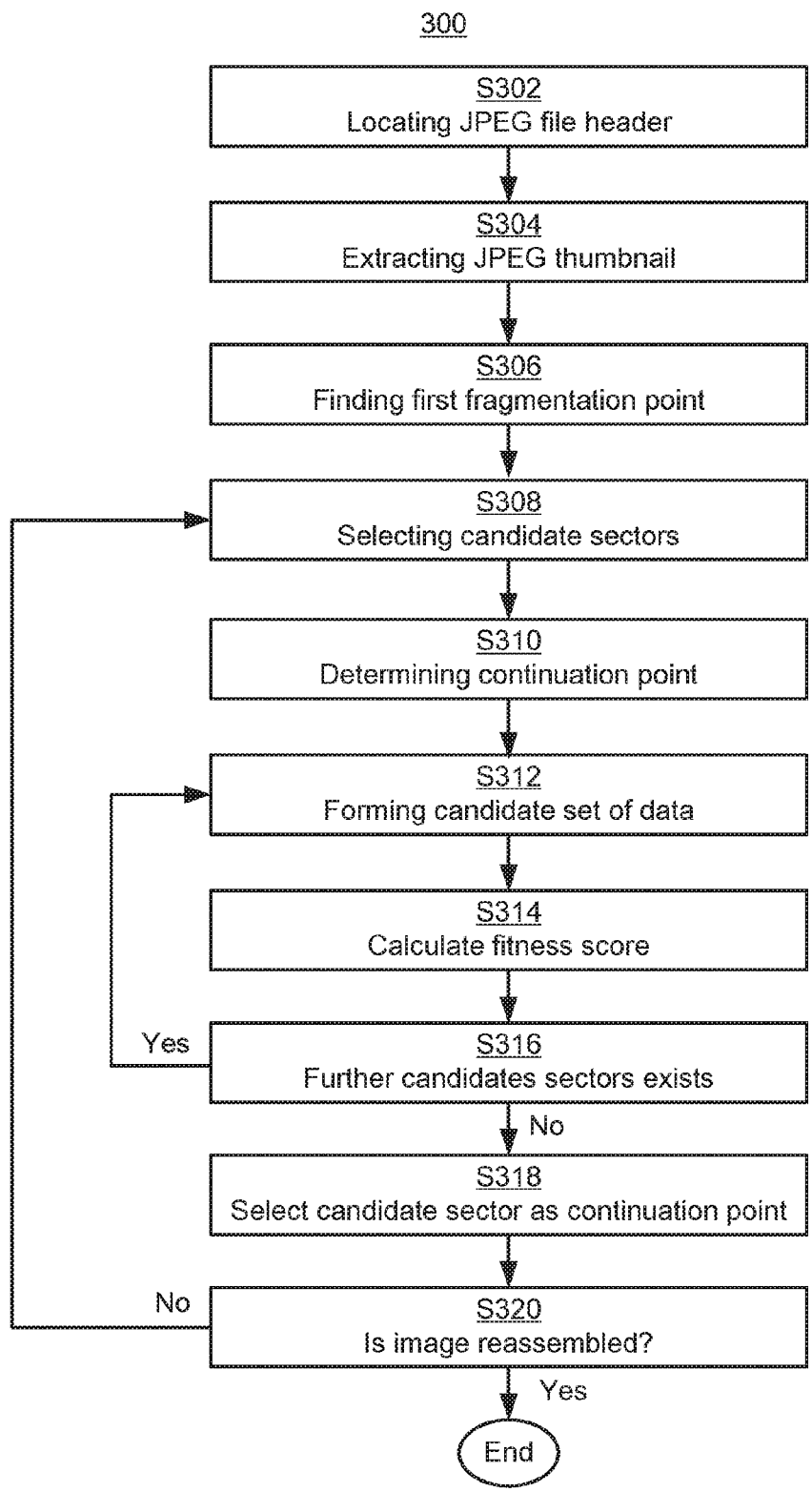
FIG. 3 shows by way of example a method for use when reassembling a fragmented JPEG image from a collection of sectors of data

The fitness score is thus calculated for the first candidate set of sectors of data, and for all other candidate set of sectors of data until no further candidate set of sectors of data exist (determined in step S316 in FIG. 3).

According to the example described above, the fitness function and the fitness score is used for determining if the first candidate sector of data 218 or the second candidate sector of data 228 starts the second fragment of the JPEG image to be reassembled. In other words, the candidate sector of data with a highest fitness score among the calculated fitness scores is selected S318 as a continuation point sector of data for determining further sectors of data belonging to the JPEG image to be reassembled. The selected continuation point sector of data thus starts the second fragment of the JPEG image to be reassembled.

As understood by the skilled person, the above described method can then be used for finding further fragments of the JPEG image to be reassembled if needed, i.e. if the JPEG image to be reassembled comprises more than two fragments. In other words, if it is determined S320 that the image to be reassembled is not fully reassembled (e.g. by comparison with the JPEG thumbnail), the steps S308-S318 are repeated until all sectors of data belonging to the JPEG image to be reassembled has been determined.

By way of example, a further specific embodiment of a method for reassembling a JPEG image will now be described. The reassembling algorithm comprises 12 steps:

1. Load dump file into memory

2. Step through the file one sector at a time, making a list of each sector beginning with hex 0xFF 0xD8 0xFF, the JPEG file signature. Call this list JPEGSTARTS 3. Step through the file one sector at a time, calculating the entropy of each sector. Put all high-entropy sectors in a list called HIGHENTROPYSECTORS 4. Create 8 lists, called RST0LIST, RST1 LIST, RST1 LIST, RST2LIST, RST3LIST, RST4LIST, RST5LIST, RST6LIST and RST7LIST for keeping track of the sectors with the different restart markers in the dump. Step through the file one sector at a time, looking for the 8 different restart markers. When one is found, add it to the appropriate list 5. For each entry in JPEGSTART, check if a thumbnail can be extracted from this sector and its consecutive sectors. For each successful thumbnail extraction, perform step 6 onwards, after this, the algorithm is finished.

6. For the current JPEG to be reassembled, step forward to the SOS marker and continue on sector by sector until either a low entropy sector is encountered, or a restart marker mismatch is detected.

7. At this point, the algorithm needs to choose the best position in the dump to continue the JPEG extraction. If the last correct marker was RST4, we need to select one of the sectors in RST5LIST. The algorithm needs the last correctly carved restart marker+1 (RST7 wraps around to RST0).

8. When the appropriate restart marker list has been selected, the algorithm needs to choose which element in the list is the best continuation of the fragmented JPEG. For each entry, continue on sector by sector until either a low entropy sector is encountered, or a restart marker mismatch is detected to obtain a fragment length.

9. Create a buffer, with the data from the start of the JPEG to be reassembled. Append the data of the fragment currently being investigated.

10. Decode the JPEG in the buffer mentioned above. Shrink it to the size of the thumbnail image. Call this CARVEDPIC.

11. Compare the thumbnail to CARVEDPIC, using a fitness function, to obtain a fitness score.

12. Select the fragment with the best fitness score as the continuation of the file.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units or stages referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of reassembling a fragmented JPEG image, the method comprising:
    locating a sector of data comprising a JPEG file signature, wherein a JPEG image to be reassembled is comprised in a collection of sectors of data that comprise a plurality of consecutive sectors of data, and the sector of data comprising the JPEG file signature is comprised in the plurality of consecutive sectors of data, wherein at least a portion of the plurality of consecutive sectors of data comprise a respective restart marker value;
    extracting a JPEG thumbnail corresponding to the JPEG image to be reassembled from the sector of data comprising the JPEG file signature and from at least one of the consecutive sectors of data;
    determining sectors of data belonging to the JPEG image to be reassembled from sectors of data consecutive to the sector of data comprising the JPEG file signature and determining a first fragmentation point sector of data, wherein the first fragmentation point sector of data corresponds to a restart marker value;
    selecting a plurality of candidate sectors of data among said at least some of the plurality of sectors of data comprising a respective restart marker value based on the restart marker value corresponding to the first fragmentation point sector of data;
    determining a continuation point sector of data for each candidate sector of data by:
        forming a candidate set of sectors of data by appending at least the candidate sector of data to the sectors of data belonging to the JPEG image to be reassembled, and
        calculating a fitness score for the candidate sector of data by using the candidate set of sectors of data and the JPEG thumbnail as parameters in a fitness function, wherein the fitness score reflects similarity between the JPEG thumbnail and a candidate JPEG image formed by the candidate set of sectors of data;
    selecting the candidate sector of data with a highest fitness score among the calculated fitness scores as a continuation point sector of data for determining further sectors of data belonging to the JPEG image to be reassembled; and
    reassembling the JPEG image using the sectors of data that have been determined to belong to the JPEG image.

2. The method of claim 1, wherein determining the sectors of data belonging to the JPEG image to be reassembled comprises at least one of:
    determining that a sector of data comprises a restart marker value which does not follow on a restart marker value of a preceding sector of data; or
    determining that a sector of data comprises low entropy data.

3. The method of claim 1, wherein forming the candidate set of sectors of data by appending at least the candidate sector of data to the sectors of data belonging to the JPEG image to be reassembled comprises:
    determining sectors of data belonging to a same JPEG image from sectors of data consecutive to the candidate sector of data and determining a second fragmentation point sector of data, wherein the sectors of data belonging to the same JPEG image comprises the candidate sector; and
    forming the candidate set of sectors of data by appending the sectors of data belonging to the same JPEG image to the sectors of data belonging to the JPEG image to be reassembled.

4. The method of claim 3, wherein determining sectors of data belonging to a same JPEG image and a second fragmentation point sector of data comprises at least one of:
    determining that a sector of data comprises a restart marker value which does not follow on a restart marker value of a preceding sector of data; or
    determining that a sector of data comprises low entropy data.

5. The method of claim 1, wherein calculating the fitness score for the candidate sector of data by using the candidate set of sectors of data and the JPEG thumbnail as parameters in a fitness function comprises:
    decoding the candidate set of sectors of data to form a candidate JPEG image, wherein the fitness function comprises comparing the candidate JPEG image with the JPEG thumbnail.

6. The method of claim 5, wherein calculating the fitness score for the candidate sector of data by using the candidate set of sectors of data and the JPEG thumbnail as parameters in a fitness function comprises:
rescaling the candidate JPEG image to match a size of the JPEG thumbnail.

7. The method of claim 3, wherein selecting a plurality of candidate sectors of data among said at least some of the plurality of sectors of data comprising a respective restart marker value, determining a continuation point sector of data for each candidate sector of data, and selecting the candidate sector of data with a highest fitness score are repeated for the second fragmentation point sector of data and any further fragmentation points of data until all sectors of data belonging to the JPEG image to be reassembled has been determined.

8. A device capable of reassembling a fragmented JPEG, the device comprising a computer-readable medium storing instructions that when executed by a processor cause the processor to:
locate a sector of data comprising a JPEG file signature, wherein a JPEG image to be reassembled is comprised in a collection of sectors of data that comprise a plurality of consecutive sectors of data, and the sector of data comprising the JPEG file signature is comprised in the plurality of consecutive sectors of data, wherein at least a portion of the plurality of consecutive sectors of data comprise a respective restart marker value;
extract a JPEG thumbnail corresponding to the JPEG image to be reassembled from the sector of data comprising the JPEG file signature and from at least one of the consecutive sectors of data;
determine sectors of data belonging to the JPEG image to be reassembled from sectors of data consecutive to the sector of data comprising the JPEG file signature and determining a first fragmentation point sector of data, wherein the first fragmentation point sector of data corresponds to a restart marker value;
select a plurality of candidate sectors of data among said at least some of the plurality of sectors of data comprising a respective restart marker value based on the restart marker value corresponding to the first fragmentation point sector of data;
determine a continuation point sector of data for each candidate sector of data by:
forming a candidate set of sectors of data by appending at least the candidate sector of data to the sectors of data belonging to the JPEG image to be reassembled, and
calculating a fitness score for the candidate sector of data by using the candidate set of sectors of data and the JPEG thumbnail as parameters in a fitness function, wherein the fitness score reflects similarity between the JPEG thumbnail and a candidate JPEG image formed by the candidate set of sectors of data;
select the candidate sector of data with a highest fitness score among the calculated fitness scores as a continuation point sector of data for determining further sectors of data belonging to the JPEG image to be reassembled; and
reassemble the JPEG image using the sectors of data that have been determined to belong to the JPEG image.

9. The device of claim 8, wherein the instructions causing the processor to determine sectors of data belonging to the JPEG image to be reassembled comprises the instructions causing the processor to determine at least one of:
that a sector of data comprises a restart marker value which does not follow a restart marker value of a preceding sector of data; or
that a sector of data comprises low entropy data.

10. The device of claim 8, wherein the instructions causing the processor to form the candidate set of sectors of data by appending at least the candidate sector of data to the sectors of data belonging to the JPEG image to be reassembled comprises the instructions causing the processor to:
determine sectors of data belonging to a same JPEG image from sectors of data consecutive to the candidate sector of data and a second fragmentation point sector of data, wherein the sectors of data belonging to the same JPEG image comprises the candidate sector, and
form the candidate set of sectors of data by appending the sectors of data belonging to the same JPEG image to the sectors of data belonging to the JPEG image to be reassembled.

11. The device of claim 10, wherein, when executed by the processor, the instructions further cause the processor to:
determine that a sector of data comprises a restart marker value which does not follow a restart marker value of a preceding sector of data when determining sectors of data belonging to the same JPEG image and the second fragmentation point sector of data; and/or
determine that a sector of data comprises low entropy data when determining sectors of data belonging to the same JPEG image and the second fragmentation point sector of data.

12. The device of claim 8, wherein the instructions causing the processor to calculate the fitness score for the candidate sector of data by using the candidate set of sectors of data and the JPEG thumbnail as parameters in the fitness function comprises the instructions causing the processor to:
decode the candidate set of sectors of data to form a candidate JPEG image, wherein the fitness function comprises comparing the candidate JPEG image with the JPEG thumbnail.

13. The device of claim 12, wherein the instructions causing the processor to calculate the fitness score for the candidate sector of data by using the candidate set of sectors of data and the JPEG thumbnail as parameters in the fitness function comprises the instructions causing the processor to:
rescale the candidate JPEG image to match a size of the JPEG thumbnail.

14. The device of claim 13, wherein the instructions causing the processor to calculate the fitness score for the candidate sector of data by using the candidate set of sectors of data and the JPEG thumbnail as parameters in the fitness function comprises the instructions causing the processor to:
convert the candidate JPEG image and the JPEG thumbnail into grayscale, wherein the fitness function comprises:
calculating a difference between each pixel in the candidate JPEG image with a corresponding pixel in the JPEG thumbnail, and
comparing the difference with a threshold value and increment a counter value for each difference that meet the threshold value, wherein the fitness score corresponds to the counter value.

15. The device of claim 13, wherein the instructions causing the processor to calculate the fitness score for the candidate sector of data by using the candidate set of sectors of data and the JPEG thumbnail as parameters in the fitness function comprises the instructions causing the processor to:
convert the candidate JPEG image and the JPEG thumbnail into grayscale, wherein the fitness function comprises:
calculating differences between pixels in the candidate JPEG image with corresponding pixels in the JPEG thumbnail,
comparing the calculated difference with a first threshold value, and incrementing a counter value for each difference that does not meet the first threshold value, wherein the device is adapted to refrain from calculating the differences between the pixels in the candidate JPEG image with the corresponding pixels in the JPEG thumbnail, and comparing the calculated difference with the first threshold value on condition that the counter value exceeds a second threshold value, wherein the fitness score is set to a first value if the counter value exceeds the threshold value, and the first fitness score is set to a second value that is higher than the first value if the counter value does not exceed the second threshold value.

16. The device of claim 8, wherein, when executed by the processor, the instructions further cause the processor to:
sort at least some of the plurality of consecutive sectors of data comprising a respective restart marker value into a plurality of lists, wherein each list corresponds to a restart marker value and comprises a plurality of sectors of data each comprising the restart marker value; and
select a list based on the restart marker value of the fragmentation point sector of data when selecting the plurality of candidate sectors of data among said at least some of the plurality of sectors of data comprising the respective restart marker value, wherein the plurality of candidate sectors of data comprise the plurality of sectors of data in the selected list.

17. The device of claim 8, wherein, when executed by the processor, the instructions further cause the processor to:
calculate an entropy value for each sector of data of the plurality of consecutive sectors of data, wherein the plurality of candidate sectors each have an entropy value above a threshold entropy value.

18. The device of claim 16, wherein, when executed by the processor, the instructions further cause the processor to:
sort sectors of data having an entropy value above the threshold entropy value when sorting said at least some of the plurality of consecutive sectors of data comprising a respective restart marker value into a plurality of lists; and
refrain from sorting sectors of data having an entropy value below the threshold entropy value when sorting said at least some of the plurality of consecutive sectors of data comprising a respective restart marker value into a plurality of lists.

19. The device of claim 10, wherein, when executed by the processor, the instructions further cause the processor to repeat the following until all sectors of data belonging to the JPEG image to be reassembled have been determined:
select a plurality of candidate sectors of data among said at least some of the plurality of sectors of data comprising a respective restart marker value,
determine a continuation point sector of data for each candidate sector of data, and
select the candidate sector of data with a highest fitness score are repeated for the second fragmentation point sector of data and any further fragmentation points of data.

20. A computer-readable storage medium comprising instructions that when executed by a processor cause the processor to carry out a method comprising:
locating a sector of data comprising a JPEG file signature, wherein a JPEG image to be reassembled is comprised in a collection of sectors of data that comprise a plurality of consecutive sectors of data, and the sector of data comprising the JPEG file signature is comprised in the plurality of consecutive sectors of data, wherein at least a portion of the plurality of consecutive sectors of data comprise a respective restart marker value;
extracting a JPEG thumbnail corresponding to the JPEG image to be reassembled from the sector of data comprising the JPEG file signature and from at least one of the consecutive sectors of data;
determining sectors of data belonging to the JPEG image to be reassembled from sectors of data consecutive to the sector of data comprising the JPEG file signature and determining a first fragmentation point sector of data, wherein the first fragmentation point sector of data corresponds to a restart marker value;
selecting a plurality of candidate sectors of data among said at least some of the plurality of sectors of data comprising a respective restart marker value based on the restart marker value corresponding to the first fragmentation point sector of data;
determining a continuation point sector of data for each candidate sector of data by:
forming a candidate set of sectors of data by appending at least the candidate sector of data to the sectors of data belonging to the JPEG image to be reassembled, and
calculating a fitness score for the candidate sector of data by using the candidate set of sectors of data and the JPEG thumbnail as parameters in a fitness function, wherein the fitness score reflects similarity between the JPEG thumbnail and a candidate JPEG image formed by the candidate set of sectors of data;
selecting the candidate sector of data with a highest fitness score among the calculated fitness scores as a continuation point sector of data for determining further sectors of data belonging to the JPEG image to be reassembled; and
reassembling the JPEG image using the sectors of data that have been determined to belong to the JPEG image.

* * * * *